United States Patent
Huang et al.

(10) Patent No.: US 11,466,214 B2
(45) Date of Patent: Oct. 11, 2022

(54) POSITIVE DIELECTRIC ANISOTROPIC LIQUID CRYSTAL COMPOSITION AND LIQUID CRYSTAL DISPLAY DEVICE

(71) Applicant: Shijiazhuang Chengzhi Yonghua Display Material Co., Ltd., Hebei (CN)

(72) Inventors: Yapeng Huang, Hebei (CN); Yunxia Qiao, Hebei (CN); Gang Wen, Hebei (CN); Qing Cui, Hebei (CN); Guoliang Yun, Hebei (CN); Mingxia Wang, Hebei (CN); Sumin Kang, Hebei (CN)

(73) Assignee: SHIJIAZHUANG CHENGZHI YONGHUA DISPLAY MATERIAL CO., LTD., Hebei (CN)

(*) Notice: Subject to any disclaimer, the term of this patent is extended or adjusted under 35 U.S.C. 154(b) by 158 days.

(21) Appl. No.: 16/398,067

(22) Filed: Apr. 29, 2019

(65) Prior Publication Data
US 2019/0256776 A1    Aug. 22, 2019

(30) Foreign Application Priority Data

May 18, 2018 (CN) ............... 201810483283.8

(51) Int. Cl.
| | |
|---|---|
| C09K 19/34 | (2006.01) |
| C09K 19/46 | (2006.01) |
| C09K 19/30 | (2006.01) |
| C09K 19/12 | (2006.01) |
| C09K 19/20 | (2006.01) |
| C09K 19/32 | (2006.01) |
| C09K 19/04 | (2006.01) |

(52) U.S. Cl.
CPC .......... *C09K 19/3491* (2013.01); *C09K 19/12* (2013.01); *C09K 19/20* (2013.01); *C09K 19/3003* (2013.01); *C09K 19/3068* (2013.01); *C09K 19/3098* (2013.01); *C09K 19/32* (2013.01); *C09K 19/3405* (2013.01); *C09K 19/46* (2013.01); *C09K 2019/0466* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3027* (2013.01); *C09K 2019/3078* (2013.01); *C09K 2019/3408* (2013.01)

(58) Field of Classification Search
CPC ........... C09K 19/3405; C09K 19/3491; C09K 2019/3004
See application file for complete search history.

(56) References Cited

U.S. PATENT DOCUMENTS

| | | | | |
|---|---|---|---|---|
| 10,351,773 | B2 * | 7/2019 | Li | C09K 19/3066 |
| 10,711,194 | B2 * | 7/2020 | Wang | C09K 19/12 |
| 2019/0256775 | A1 * | 8/2019 | Wang | C09K 19/3066 |
| 2019/0345129 | A1 * | 11/2019 | Li | C07D 333/76 |
| 2020/0032132 | A1 * | 1/2020 | Hassan | C08F 220/56 |
| 2020/0032144 | A1 * | 1/2020 | Meng | C09K 19/20 |
| 2020/0239776 | A1 * | 7/2020 | Kang | C09K 19/3066 |
| 2020/0239777 | A1 * | 7/2020 | Kang | C09K 19/3003 |
| 2020/0239778 | A1 * | 7/2020 | Kang | C09K 19/3003 |

FOREIGN PATENT DOCUMENTS

WO    WO-2019107394 A1 *  6/2019  .......... C07D 409/14

OTHER PUBLICATIONS

English translation of WO2019107394. (Year: 2019).*

* cited by examiner

*Primary Examiner* — Chanceity N Robinson
*Assistant Examiner* — Anna Malloy
(74) *Attorney, Agent, or Firm* — Muncy, Geissler, Olds & Lowe, P.C.

(57) ABSTRACT

A positive dielectric anisotropic liquid crystal composition includes one or more compounds of formula I and one or more compounds of formula II:

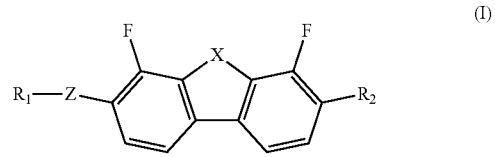

(I)

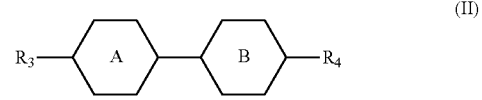

(II)

wherein R1 represents cyclopropyl, cyclobutyl or cyclopentyl, R2, R3 and R4 are as defined in the specification, and a liquid crystal display device. The liquid crystal composition has positive dielectric properties, a high charge retention ratio, a low rotary viscosity, a fast response time, and especially a high transmittance, and is suitable for manufacturing a TFT-LCD with a high transmittance and a fast response.

5 Claims, No Drawings

POSITIVE DIELECTRIC ANISOTROPIC LIQUID CRYSTAL COMPOSITION AND LIQUID CRYSTAL DISPLAY DEVICE

TECHNICAL FIELD

The present invention belongs to the technical field of liquid crystal materials, and in particular relates to a liquid crystal composition and a liquid crystal display device.

BACKGROUND ART

At the end of the 19th century, Austrian botanists discovered a liquid crystal, i.e. a crystal in a liquid state, that is, a substance has both the fluidity of liquids and certain alignment characteristics similar to those of crystals. Under the action of an electric field, the alignment of liquid crystal molecules changes, which affects the optical properties thereof. British scientists manufactured the first liquid crystal display (LCD) by using this property in the last century. Liquid crystal display materials have the advantages of a low drive voltage, a low power consumption, a high reliability, a large amount of display information, color display, etc., liquid crystal displays have been developed rapidly, and the renewal speed of liquid crystal monomers is accelerated. At present, there are more than 10,000 kinds of liquid crystal monomers, which are mainly used for from TN and STN to currently developed display modes for large color screens, e.g., TN-TFT, VA-TFT, IPS-TFT and PDLC.

At present, in the liquid crystal display device industry, display modes mainly include in-plane switching (IPS), fringe-field switching (FFS), vertical alignment (VA), etc. Among them, the in-plane switching (IPS) has the characteristic of a wide viewing angle, the director of liquid crystal molecules and the glass substrate direction are parallel, and for the IPS aligned in parallel, the dielectric anisotropy ($\Delta\varepsilon$) of the liquid crystal may be positive or may also be negative. The fringe-field switching (FFS) is one of in-plane switching (IPS) modes. The vertical alignment (VA) mode has a good contrast, and when in a zero field, the liquid crystal molecules are perpendicular to the direction of a glass substrate, and are parallel to perpendicular incident light. When it is orthogonal to a polarizer, a good dark state is exhibited, and the dielectric anisotropy ($\Delta\varepsilon$) of the liquid crystal must be negative.

The transmittance affects the contrast of a liquid crystal panel, and is an important factor. For the transmittance of the display modes of in-plane switching, fringe-field switching, vertical alignment, etc., only about 5% of backlight in can penetrate the display device, and most of the light is consumed, resulting in a higher panel energy consumption.

SUMMARY OF THE INVENTION

In order to solve the above-mentioned technical problems, the present invention provides a positive dielectric anisotropic liquid crystal composition, characterized by comprising one or more negative compounds represented by formula. I and one or more neutral compounds represented by formula II:

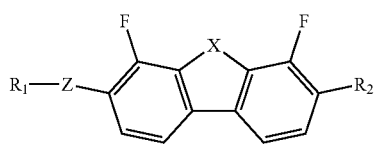
(I)

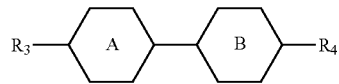
(II)

wherein in formula I, $R_1$ represents cyclopropyl, cyclobutyl or cyclopentyl; Z represents a single bond, —$CH_2$—, —O—, —$CH_2CH_2$— or —$CH_2O$—; $R_2$ represents a hydrogen atom, a fluorine atom, an alkyl group having a carbon atom number of 1-7 or an alkoxy group having a carbon atom number of 1-7; and X represents an oxygen atom or a sulfur atom; and in formula II, $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8, and

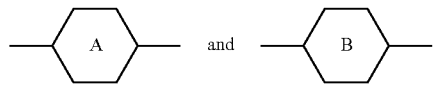

each independently represent

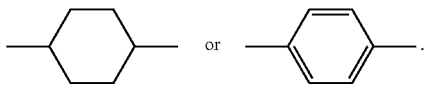

The inventors of the present invention have found through intensive studies that by applying a liquid crystal composition having dibenzofuran and dibenzothiophene represented by formula I, and a liquid crystal compound represented by formula II to a liquid crystal composition, a liquid crystal composition having a high refractive index and thus a significantly improved transmittance is obtained. Although the detailed principle of an increase in refractive index is not very clear, the inventors speculate that due to the presence of two fluorine atoms on the lateral sides of the dibenzofuran and dibenzothiophene liquid crystal compounds and the existence of a rigid structure in the molecules, the deflection between the two benzene rings is limited, resulting in the absolute value of the dielectric anisotropy of such compounds being very large, so that it has a very high refractive index, which can significantly improve the transmittance of the liquid crystal composition. By adding the dibenzofuran and dibenzothiophene liquid crystal compounds represented by formula I to the liquid crystal composition, the transmittance and the response time of the liquid crystal composition can be improved, the transmittance of the liquid crystal display device can be remarkably improved, and the energy consumption of the liquid crystal display device can be reduced. The liquid crystal composition of the present invention can be applied to display devices of modes such as IPS-TFT, FFS-TFT and OCB.

In the positive dielectric anisotropic liquid crystal composition of the present invention, the total mass content of one or more negative compounds represented by formula I is preferably 1%-30%, and the total mass content of one or more neutral compounds represented by formula II is preferably 20%-80%;

in the positive dielectric anisotropic liquid crystal composition of the present invention, it is preferable that the one or more negative compounds represented by, formula I are selected from the group consisting of compounds represented by formulas I1 to I24 below:

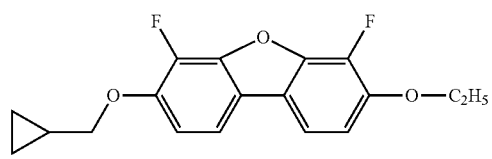

I1

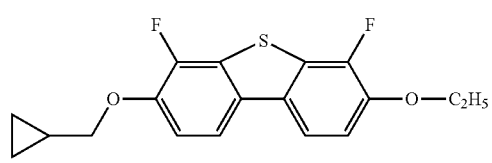

I2

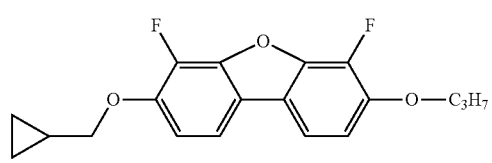

I3

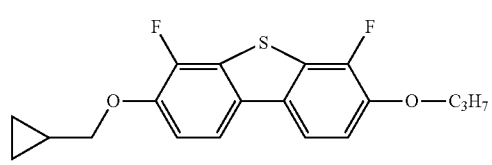

I4

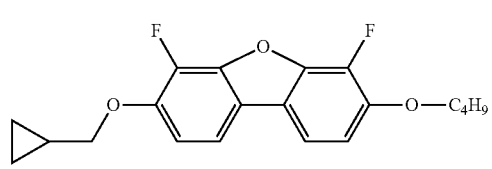

I5

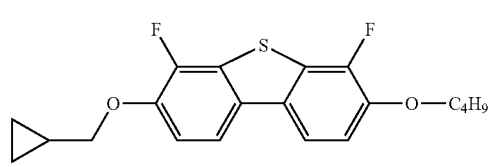

I6

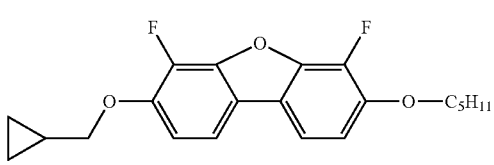

I7

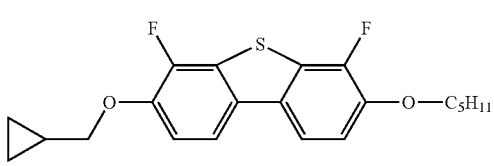

I8

-continued

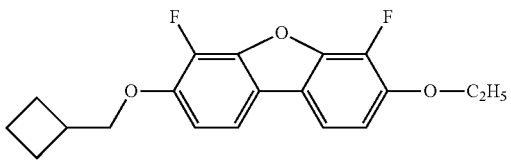

I9

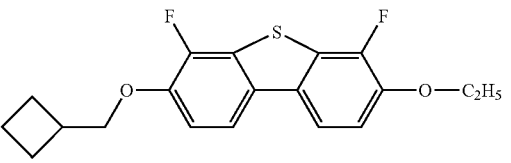

I10

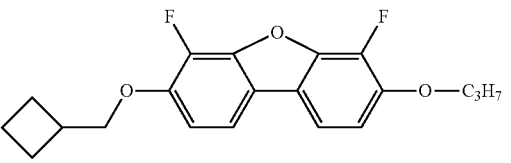

I11

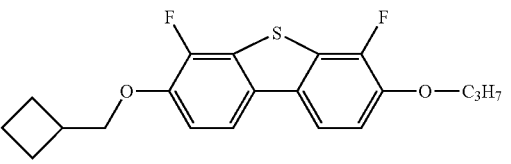

I12

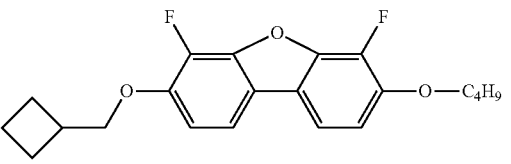

I13

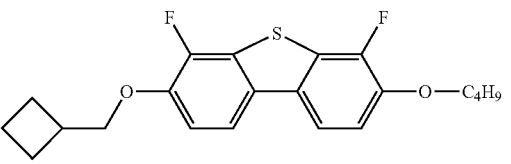

I14

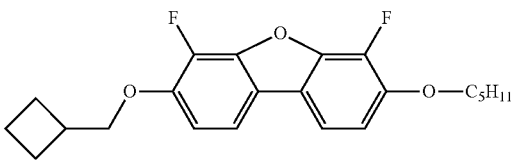

I15

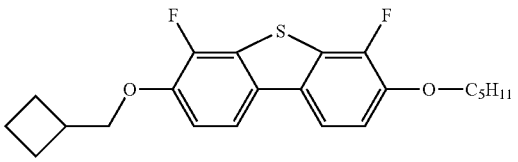

I16

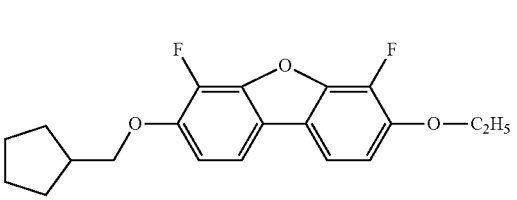

I17

-continued

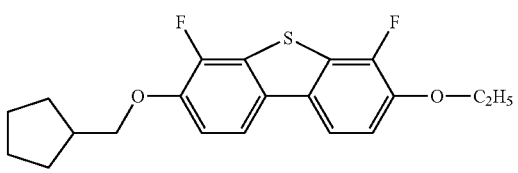
I18

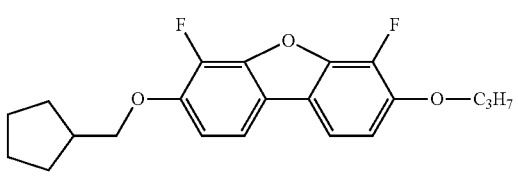
I19

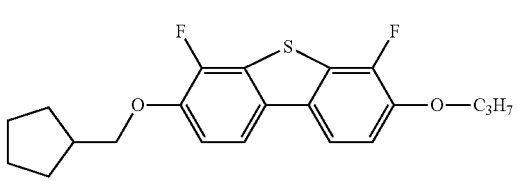
I20

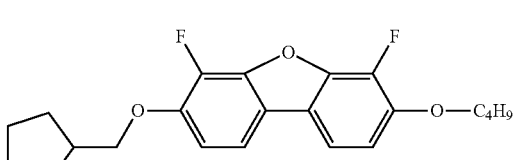
I21

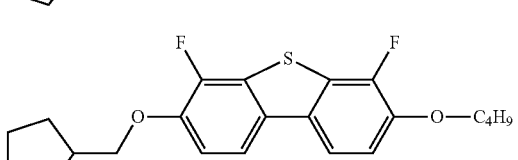
I22

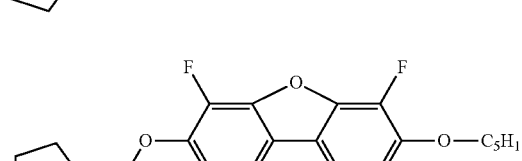
I23

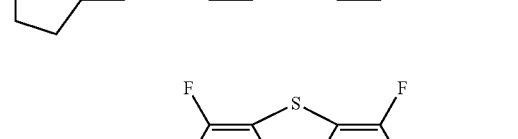
I24 and it is preferable that the one or more neutral compounds represented by formula II are selected from the group consisting of compounds represented by formulas II1 to II13 below:

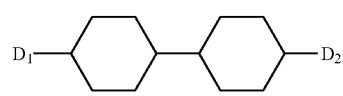
II1

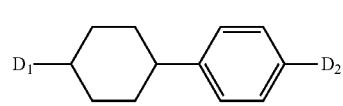
II2

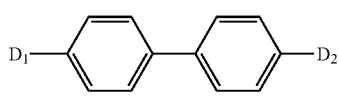
II3 wherein $D_1$ and $D_2$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8.

In the positive dielectric anisotropic liquid crystal composition of the present invention, it is preferable comprising one or more negative compounds represented by formulas III-a to III-q below:

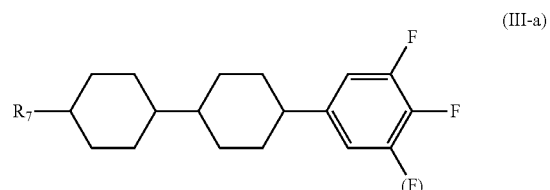
(III-a)

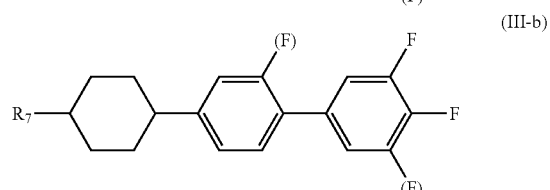
(III-b)

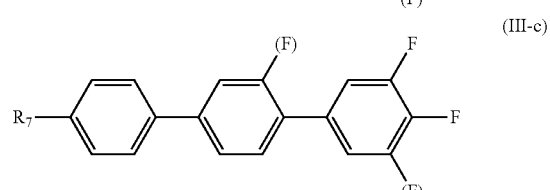
(III-c)

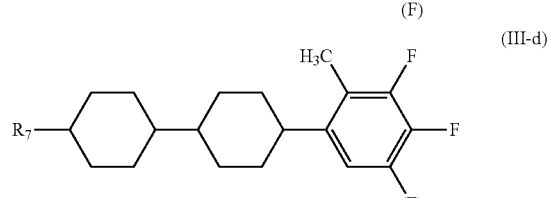
(III-d)

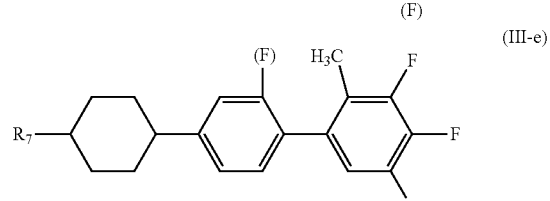
(III-e)

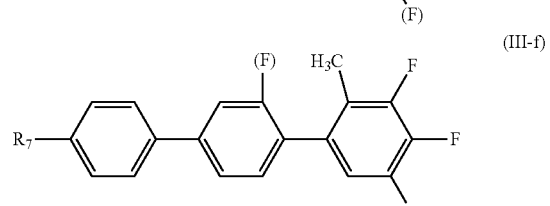
(III-f)

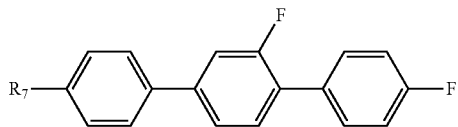
(III-g)

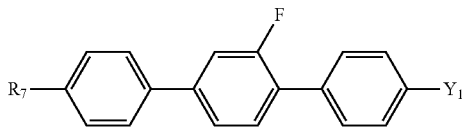
(III-h)

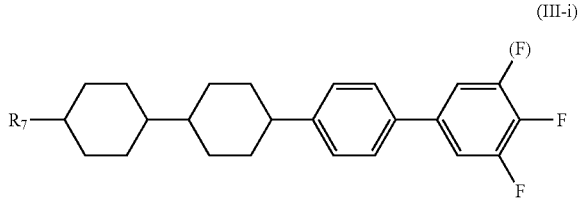
(III-i)

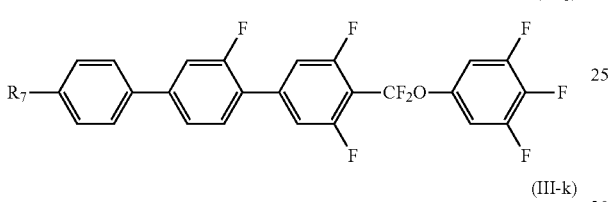
(III-j)

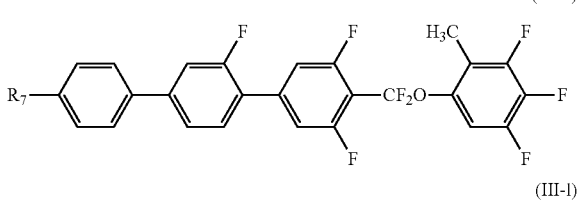
(III-k)

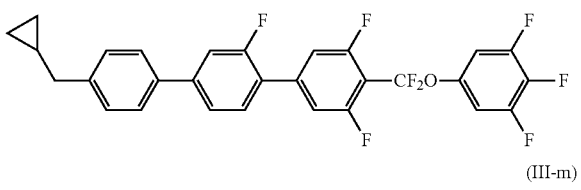
(III-l)

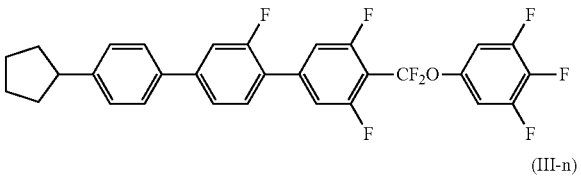
(III-m)

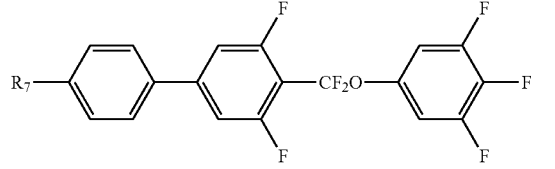
(III-n)

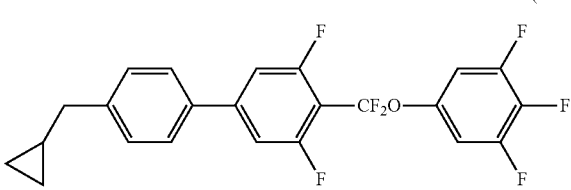
(III-o)

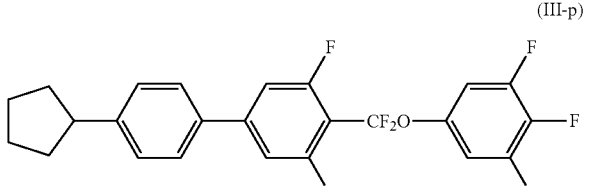
(III-p)

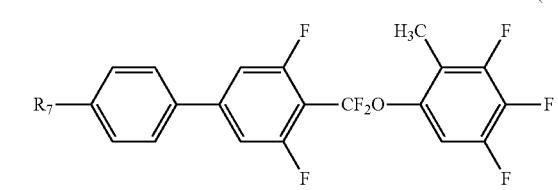
(III-q)

wherein $R_7$ represents a linear alkyl group having a carbon atom number of 1-10,

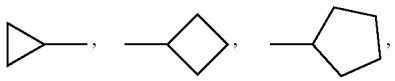

an alkoxy group having a carbon atom number of 1-10 or an alkenyl group having a carbon atom number of 2-10; $Y_1$ represents F, an alkyl group having a carbon atom number of 1-6 which is unsubstituted or monosubstituted or polysubstituted with F, an alkoxy group having a carbon atom number of 1-6 which is unsubstituted or monosubstituted or polysubstituted with F, an alkenyl group having a carbon atom number of 2-6 which is unsubstituted or monosubstituted or polysubstituted with F; and (F) represents hydrogen or fluorine.

It is preferable that the positive dielectric anisotropic liquid crystal composition of the present invention further comprises one or more compounds represented by formula VI:

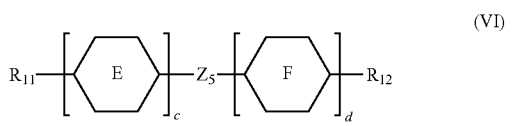
(VI)

wherein $R_{11}$ and $R_{12}$ each independently represent a linear alkyl group having a carbon atom number of 1-10,

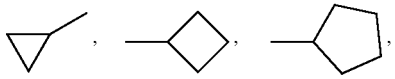

an alkoxy group having a carbon atom number of 1-10 or an alkenyl group having a carbon atom number of 2-10;

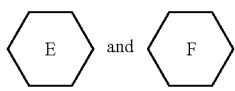

are selected from the group consisting of groups shown in 3) or 4):

3) represents trans 1,4-cyclohexylene, or 1,4-cyclohexenyl, wherein one or more non-neighboring —CH$_2$13 groups are substituted with —O— or —S— or are unsubstituted; and 4) represents 1,4-phenylene, wherein one or two non-neighboring —CH— are substituted with O or are unsubstituted, and one or two H are substituted with F or are unsubstituted;

Z$_5$ represents hydrogen or an ester group; and c and d each independently represent 1 or 2.

In the positive dielectric anisotropic liquid crystal composition of the present invention, it is preferable that said one or more compounds represented by formula VI are selected from the group consisting of compounds represented by formulas VI-a to VI-e below

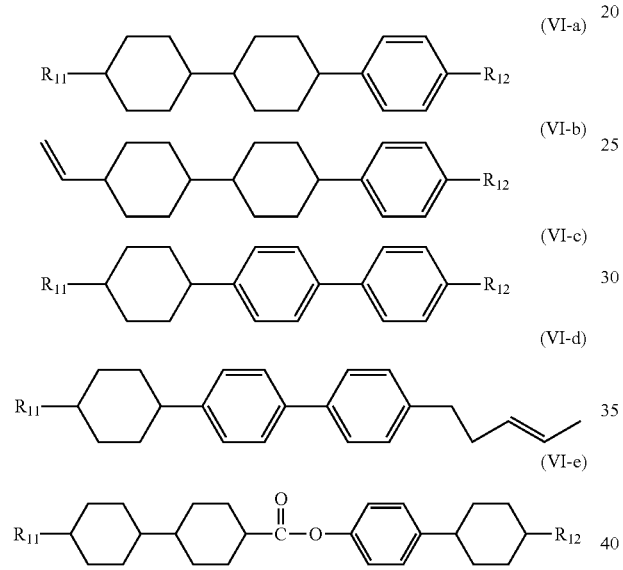

wherein R$_{11}$ and R$_{12}$ each independently represent a linear alkyl group having a carbon atom number of 1-10,

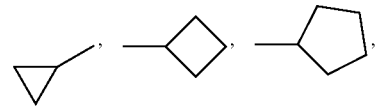

an alkoxy group having a carbon atom number of 1-10 or an alkenyl group having a carbon atom number of 2-10.

It is preferable that the positive dielectric anisotropic liquid crystal composition of the present invention further comprises one or more compounds represented by formula VII:

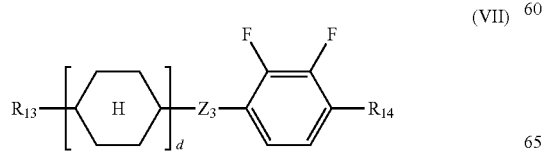

wherein R$_{13}$ each independently represent a linear alkyl group having a carbon atom number of 1-10,

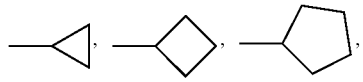

an alkoxy group having a carbon atom number of 1-10 or an alkenyl group having a carbon atom number of 2-10;

R$_{14}$ represents a linear alkyl group having a carbon atom number of 1-5, or an alkyl ether in which an oxygen atom is bonded to a benzene ring;

is selected from the group consisting of groups shown in 5) or 6):

5) represents trans 1,4-cyclohexylene, or 1,4-cyclohexenyl, wherein one or more non-neighboring —CH$_2$— groups are substituted with —O— or —S— or are unsubstituted; and 6) represents 1,4-phenylene, wherein one or two non-neighboring —CH— are substituted with N or are unsubstituted, and one or two H are substituted with F or are unsubstituted;

Z$_3$ represents a single bond, —CH$_2$—, —CH$_2$—CH$_2$—, —(CH$_2$)$_3$—, —(CH$_2$)$_4$—, —CH=CH—, —C≡C—, —COO—, —OOC—, —CF$_2$O—, —OCH$_2$—, —CH$_2$O—, —OCF$_2$—, —CF$_2$CH$_2$—, —CH$_2$CF$_2$—, —C$_2$F$_4$— or —CF=CF—;

d represents 0, 1 or 2; where d=2,

may be the same or different.

In the positive dielectric anisotropic liquid crystal composition of the present invention, it is preferable that said one or more compounds represented by formula VII are selected from the group consisting of compounds represented by formulas VII-a to VII-i below:

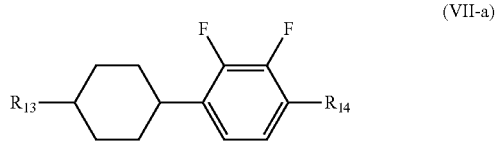

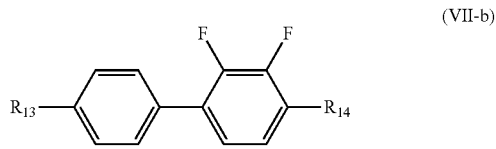

-continued

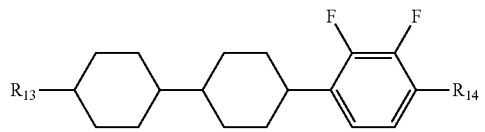
(VII-c)

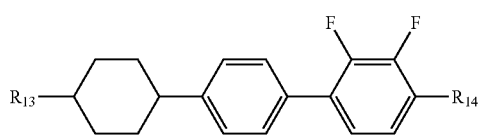
(VII-d)

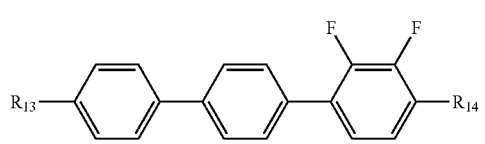
(VII-e)

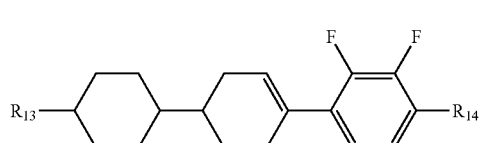
(VII-f)

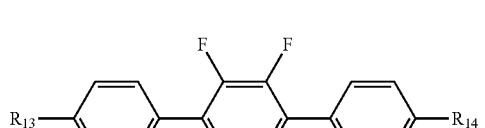
(VII-g)

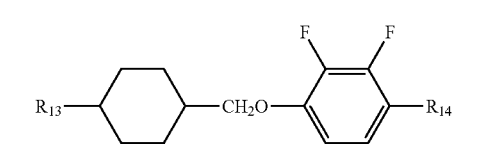
(VII-h)

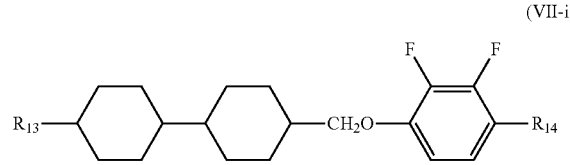
(VII-i)

wherein $R_{13}$ each independently represents a linear alkyl group having a carbon atom number of 1-10

an alkoxy group having a carbon atom number of 1-10 or an alkenyl group having a carbon atom number of 2-10; and $R_{14}$ represents a linear alkyl group having a carbon atom number of 1-5, or an alkyl ether in which an oxygen atom is bonded to a benzene ring.

The liquid crystal composition of the present invention may comprise one or more selected from the group consisting of ultraviolet stabilizers, dopants and/or antioxidants as additives.

For antioxidants, ultraviolet absorbers, and light stabilizers, the following substances may be listed:

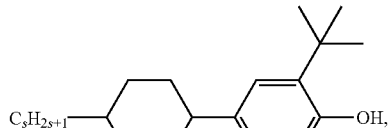

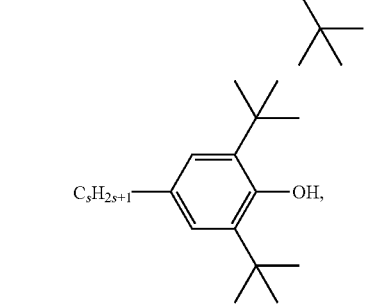

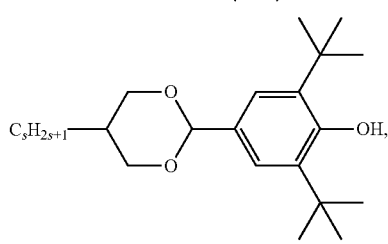

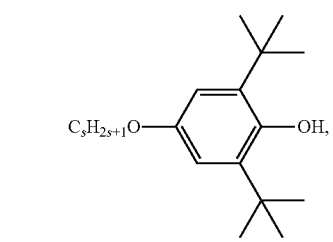

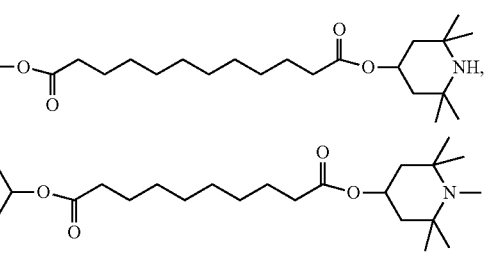

in which S an integer selected from 1-10.

DETAILED DESCRIPTION OF EMBODIMENTS

The present invention will be described in further detail below in conjunction with specific examples:

The liquid crystal composition of the present invention may be prepared by means of a method in which liquid crystal compounds are mixed, e.g., by means of a method in which different components are mixed at a high temperature and dissolved in each other, and the liquid crystal composition of the present invention may also be prepared by means of other conventional preparation methods such as using heating, ultrasonication, suspension, etc.

In the present specification, the percentages are mass percentages, the temperatures are in degree Celsius (° C.), and the specific meanings of other symbols and the test conditions are as follows:

Cp represents the clearing point (° C.) of the liquid crystal measured by a DSC quantitative method;

S—N represents the melting point (° C.) for the transformation of a liquid crystal from a crystal state to a nematic phase;

Δn represents optical anisotropy, $n_o$ is the refractive index of an ordinary light, $n_e$ is the refractive index of an extraordinary light, with the test conditions being: 25±2° C. 589 rem and using an abbe refractometer for testing;

Δε represents dielectric anisotropy, with $\Delta\varepsilon = \varepsilon_{//} - \varepsilon_{\perp}$, in which $\varepsilon_{//}$ is a dielectric constant parallel to a molecular axis, and $\varepsilon_{\perp}$ is a dielectric constant perpendicular to the molecular axis, with the test conditions being 25±0.5° C., a 20 micron parallel cell, and INSTEC: ALCT-IR1 for testing;

γ1 represents a rotary viscosity (mPa·s), with the test conditions being 25±0.5° C., a 20 micron parallel cell, and INSTEC: ALCT-IR1 for testing; and ρ represents electrical resistivity (Ω·cm), with the test conditions being: 25±2° C., and the test instruments being a TOYO SR6517 high resistance instrument and an LE-21 liquid electrode.

VHR represents a voltage holding ratio (%), with the test conditions being: 20±2° C., a voltage of ±5 V, a pulse width of 10 ms, and a voltage holding time of 16.7 ms. The test equipment is a TOYO Model 6254 liquid crystal performance comprehensive tester.

τ represents response time (ms), with the test instrument being DMS-501 and the test conditions being: 25±0.5° C., a test cell that is a 3.3 micron IPS test cell, an electrode spacing and an electrode width, both of which are 10 microns, and an included angle between the frictional direction and the electrode of 10°.

T (%) represents transmittance, with T (%)=100%* bright state (Vop) luminance/light source luminance, with the test instrument being DMS501, and the test conditions being: 25±0.5° C., a test cell that is a 3.3 micron IPS test cell, an electrode spacing and an electrode width, both of which are 10 microns, and an included angle between the frictional direction and the electrode of 10°.

Comparative Example 1

| Category | Structural formula of liquid crystal monomer | content (%) | Test parameter |
|---|---|---|---|
| VI | C$_3$H$_7$—[Cy]—[Ph]—[Ph]—C$_2$H$_5$ | 5 | S-N (° C.): ≤ −30 |
| III | C$_2$H$_5$—[Cy]—[Cy]—[Ph(3,4,5-triF)]—F | 6 | Cp (° C.): 80 |
| III | C$_3$H$_7$—[Cy]—[Ph]—[Ph(3,4,5-triF)]—F | 7 | γ1 (mPa·s): 60 |
| VI | C$_3$H$_7$—[Cy]—[Cy]—[Cy]—CH$_3$ | 7 | Δn: 0.1220 |
| II | C$_3$H$_7$—[Cy]—[Cy]—CH=CH$_2$ | 17 | Δε: 7.3 |
| III | C$_3$H$_7$—[Ph]—[Ph(2-F)]—[Ph(2,6-diF)]—CF$_2$O—[Ph(2,3,5-triF)]—F | 7 | $\varepsilon_\perp$: 3.3 |
| III | C$_4$H$_9$—[Ph]—[Ph(2-F)]—[Ph(2,6-diF)]—CF$_2$O—[Ph(2,3,5-triF)]—F | 8 | τ (ms): 38.67 |
|   |   |   | T (%): 3.8 |

-continued

| Category | Structural formula of liquid crystal monomer | content (%) | Test parameter |
|---|---|---|---|
| III | C₃H₇–⟨phenyl⟩–⟨phenyl(F)⟩–⟨phenyl⟩–F | 10 | |
| III | C₄H₉–⟨phenyl⟩–⟨phenyl(F)⟩–⟨phenyl⟩–F | 8 | |

Example 1

| Category | Structural formula of liquid crystal monomer | content (%) | Test parameter |
|---|---|---|---|
| VI | C₃H₇–⟨cyclohexyl⟩–⟨phenyl⟩–⟨phenyl⟩–C₂H₅ | 5 | S-N (° C.): ≤ −30<br>Cp (° C.): 80<br>γ1 (mPa · s): 61<br>Δn: 0.1224<br>Δε: 6.9<br>ε⊥: 3.6<br>τ (ms): 33.65<br>T (%): 4.1 |
| III | C₂H₅–(branched)–⟨cyclohexyl⟩–⟨phenyl(3F)⟩ | 6 | |
| III | C₃H₇–⟨cyclohexyl⟩–⟨phenyl⟩–⟨phenyl(3F)⟩ | 5 | |
| VI | C₃H₇–⟨cyclohexyl⟩–⟨cyclohexyl⟩–⟨phenyl⟩–CH₃ | 7 | |
| II | C₃H₇–(branched)–⟨cyclohexyl⟩–CH=CH₂ | 42 | |
| III | C₃H₇–⟨phenyl⟩–⟨phenyl(F)⟩–⟨phenyl(F,F)⟩–CF₂O–⟨phenyl(F,F)⟩–F | 7 | |
| III | C₄H₉–⟨phenyl⟩–⟨phenyl(F)⟩–⟨phenyl(F,F)⟩–CF₂O–⟨phenyl(F,F)⟩–F | 8 | |

-continued

| Category | Structural formula of liquid crystal monomer | content (%) | Test parameter |
|---|---|---|---|
| III | C3H7—⌬—⌬(F)—⌬—F | 10 | |
| III | C4H9—⌬—⌬(F)—⌬—F | 8 | |
| I | dibenzofuran derivative with F, F, O-cyclopropylmethyl, O-C2H5 | 2 | |

It can be seen from the comparison between Example 1 and Comparative Example 1 that, on the basis that Example 1 in which a negative compound represented by formula I and a neutral compound represented by formula II are used in combination maintains clearing point, refractive index, response time, etc. at levels comparable to Comparative Example 1, it has a significantly increased transmittance, thereby obtaining a liquid crystal composition with an excellent performance, i.e., a fast response and a high transmittance.

Example 2

| Category | Structural formula of liquid crystal monomer | content (%) | Test parameter |
|---|---|---|---|
| VI | C3H7—⌬—⌬—⌬—C2H5 | 5.5 | S-N (° C.): ≤ −30<br>Cp (° C.): 77<br>γ1 (mPa · s): 68<br>Δn: 0.1222<br>Δε: 6.0<br>ε⊥: 4.0<br>τ (ms): 28.17<br>T (%): 4.5 |
| III | C3H7—⌬⌬—⌬—⌬(F,F,F) | 20 | |
| VI | C3H7—⌬—⌬—⌬—CH3 | 8 | |
| II | C3H7—⌬⌬—⌬—CH=CH2 | 13.5 | |
| II | C3H7—⌬—⌬—CH=CH2 | 10 | |
| II | C5H11—⌬—⌬—CH3 | 5 | |
| II | C4H9—⌬—⌬—C3H7 | 10 | |

-continued

| Category | Structural formula of liquid crystal monomer | content (%) | Test parameter |
|---|---|---|---|
| III | 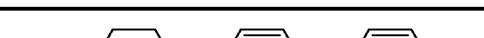 | 5 | |
| III | | 5 | |
| III | | 5 | |
| III | | 8 | |
| I | | 2 | |
| I | | 3 | |

It can be seen that compared with Comparative Example 1, Example 2 has an increased transmittance and a fast response, is suitable for display applications such as large-size IPS-TV with a low cell thickness, and is advantageous for achieving a wide viewing angle, a high contrast, high-quality dynamic picture play, etc.

Example 3

| Category | Structural formula of liquid crystal monomer | content (%) | Test parameter |
|---|---|---|---|
| VI | 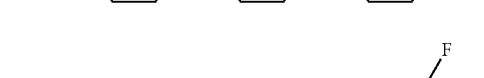 | 5 | S-N (° C.): ≤ −30<br>Cp (° C.): 73<br>γ1 (mPa · s): 74<br>Δn: 0.1219<br>Δε: 5.2 |
| III | | 20 | $\varepsilon_\perp$: 4.7<br>τ (ms): 23.87<br>T (%): 5.0 |

-continued
| Category | Structural formula of liquid crystal monomer | content (%) | Test parameter |
|---|---|---|---|
| VI |  | 8 | |
| II | 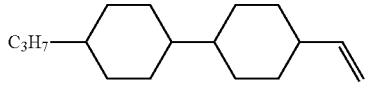 | 21.5 | |
| II | 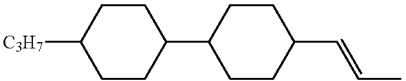 | 10 | |
| II | 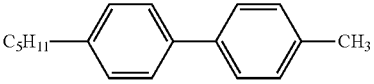 | 2 | |
| II | 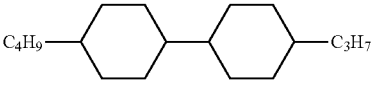 | 3 | |
| III | 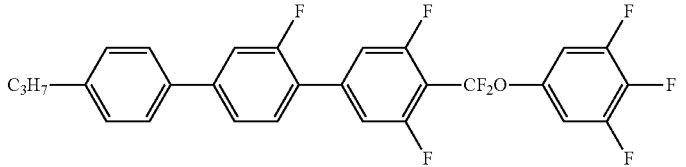 | 5 | |
| III | 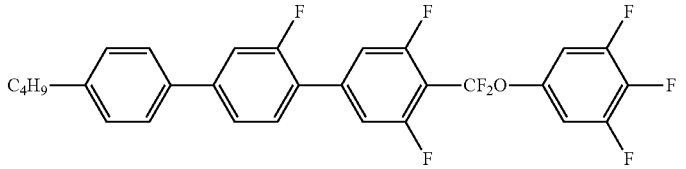 | 5 | |
| III | 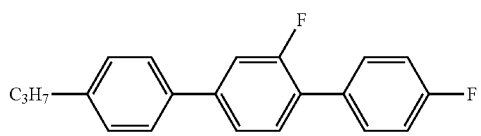 | 5 | |
| III | 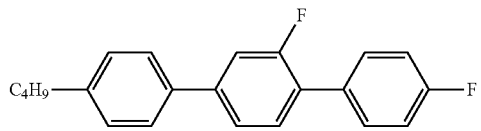 | 5.5 | |
| I | 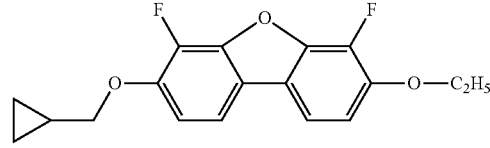 [SMILES: CCOc1ccc2c(oc3c(F)c(OCC4CC4)ccc32)c1F] | 2 | |
| I | 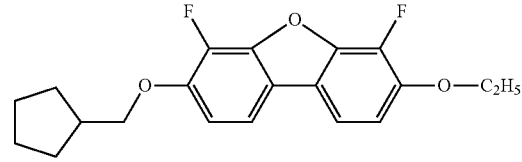 | 3 | |

| Category | Structural formula of liquid crystal monomer | content (%) | Test parameter |
|---|---|---|---|
| I | 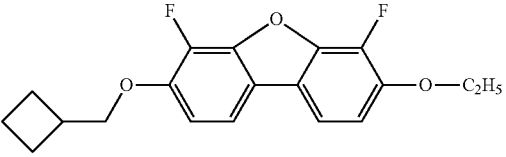 | 3 | |
| I | 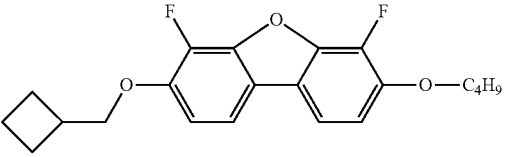 | 2 | |

Compared with Comparative Example 1, the refractive index of Example 3 is basically unchanged, the vertical dielectric is increased, the transmittance is further increased, and the high-and-low temperature stability is good; in conjunction with the wide viewing angle advantage of the IPS display modes, it applies to the fields of TV, small and medium size LCD display, etc.

Example 4

| Category | Structural formula of liquid crystal monomer | content (%) | Test parameter |
|---|---|---|---|
| VI |  | 3 | S-N (° C.): ≤ −30<br>Cp (° C.): 78<br>γ1 (mPa · s): 61<br>Δn: 0.1219<br>Δε: 7.0<br>ε⊥: 3.6<br>τ (ms): 33.27<br>T (%): 4.2 |
| III | 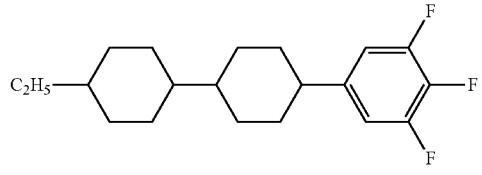 [SMILES: CCC1CCC(C2CCC(c3cc(F)c(F)c(F)c3)CC2)CC1] | 6 | |
| III | 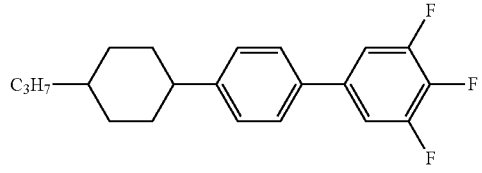 | 5 | |
| VI | 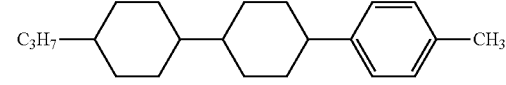 | 7 | |
| II | 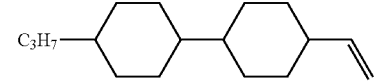 | 30 | |
| II | 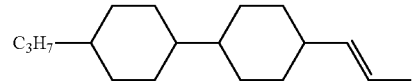 | 10 | |
| III | 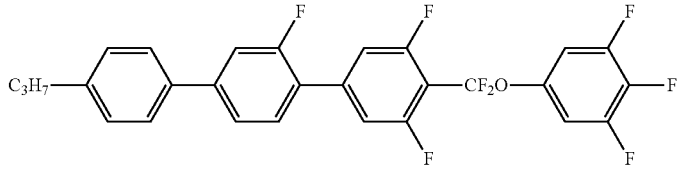 | 7 | |

| Category | Structural formula of liquid crystal monomer | content (%) | Test parameter |
|---|---|---|---|
| III | C₄H₉—⟨phenyl⟩—⟨phenyl-F⟩—⟨phenyl-F,F⟩—CF₂O—⟨phenyl-F,F,F⟩ | 8 | |
| III | C₃H₇—⟨phenyl⟩—⟨phenyl-F⟩—⟨phenyl⟩—F | 10 | |
| III | C₄H₉—⟨phenyl⟩—⟨phenyl-F⟩—⟨phenyl⟩—F | 8 | |
| I | cyclopropylmethyl-O—⟨dibenzothiophene-F,F⟩—O—C₂H₅ | 2 | |

The liquid crystal composition of Example 4 has an appropriate refractive index and clearing point, a high transmittance, and a fast response, and in conjunction with the wide viewing angle advantage of the IPS display modes, it applies to small and medium-sized handheld terminal display applications.

Example 5

| Category | Structural formula of liquid crystal monomer | content (%) | Test parameter |
|---|---|---|---|
| III | C₂H₅—⟨Cy⟩—⟨Cy⟩—⟨phenyl-F,F,F⟩ | 6 | S-N (° C.): ≤ −30<br>Cp (° C.): 76<br>γ1 (mPa · s): 62<br>Δn: 0.1217<br>Δε: 6.8<br>ε⊥: 4.0<br>τ (ms): 30.72<br>T (%): 4.7 |
| III | C₃H₇—⟨Cy⟩—⟨phenyl⟩—⟨phenyl-F,F,F⟩ | 7 | |
| VI | C₃H₇—⟨Cy⟩—⟨Cy⟩—⟨phenyl⟩—CH₃ | 7 | |
| II | C₃H₇—⟨Cy⟩—⟨Cy⟩—CH=CH₂ | 42 | |

-continued

| Category | Structural formula of liquid crystal monomer | content (%) | Test parameter |
|---|---|---|---|
| III | 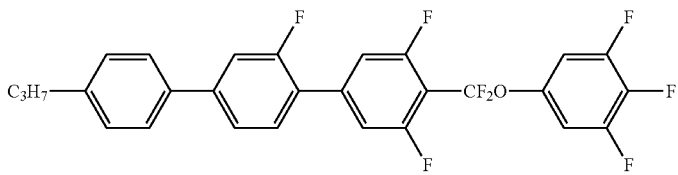 | 7 | |
| III | 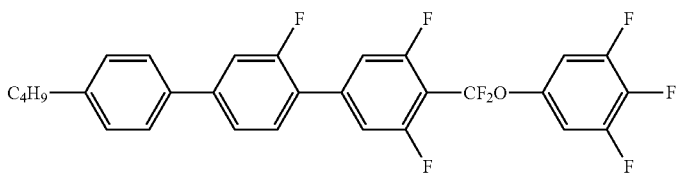 | 8 | |
| III | 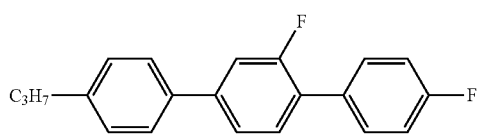 | 10 | |
| III | 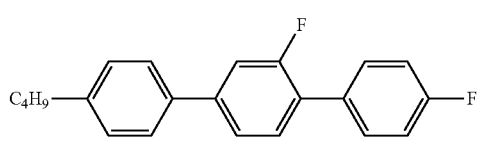 | 8 | |
| I | 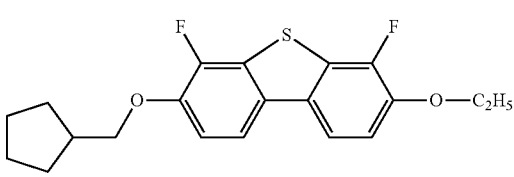 [SMILES: CCOc1ccc2c(sc3c(F)c(OCC4CCCC4)ccc32)c1F] | 3 | |
| I | 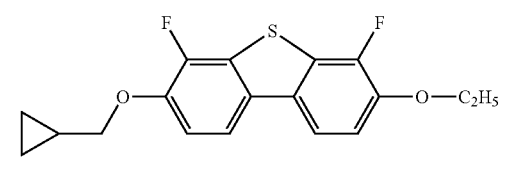 | 2 | |

The liquid crystal composition of Example 5 has an appropriate refractive index and clearing point, a high transmittance, and a fast response, and in conjunction with the wide viewing angle advantage of the IPS display modes, it applies to handheld terminal display applications.

Example 6

| Category | Structural formula of liquid crystal monomer | content (%) | Test parameter |
|---|---|---|---|
| III | 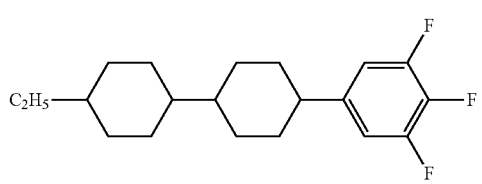 | 6 | S-N (° C.): ≤ −30<br>Cp (° C.): 73<br>γ1 (mPa · s): 66<br>Δn: 0.1222<br>Δε: 6.0<br>ε⊥: 4.6<br>τ (ms): 23.10<br>T (%): 6.2 |

-continued
| Category | Structural formula of liquid crystal monomer | content (%) | Test parameter |
|---|---|---|---|
| III | 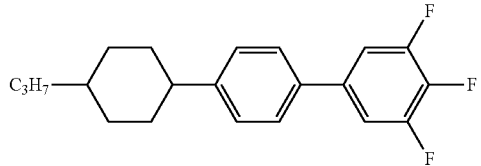 | 7 | |
| VI | 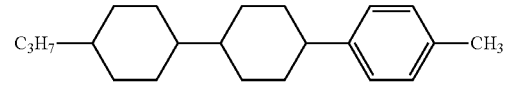 | 5 | |
| II | 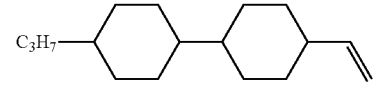 | 26.5 | |
| II | 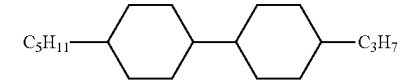 | 10 | |
| II | 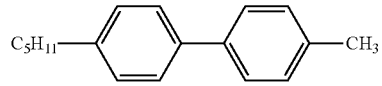 | 5 | |
| III | 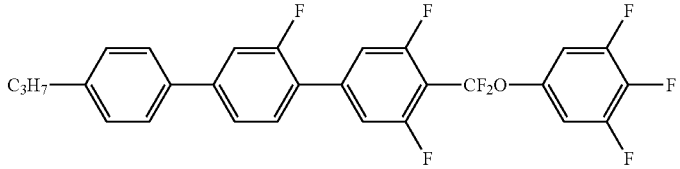 | 7 | |
| III | 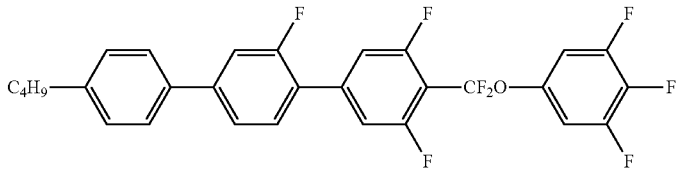 | 8 | |
| III | 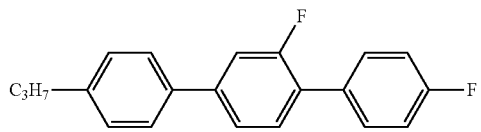 | 10 | |
| III | 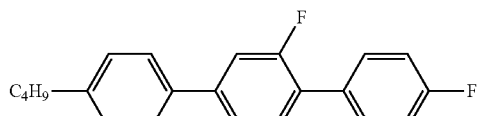 | 5.5 | |
| I | 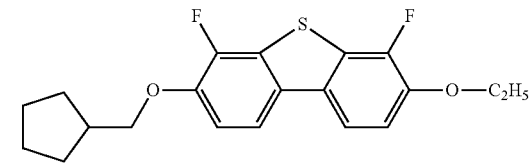 | 2 | |
| I | 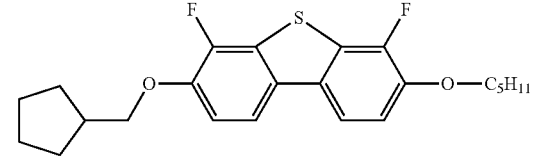 | 3 | |

-continued

| Category | Structural formula of liquid crystal monomer | content (%) | Test parameter |
|---|---|---|---|
| I | [structure: dibenzothiophene with F,F substituents, cyclopropylmethoxy and O—$C_5H_{11}$ groups] | 3 | |
| I | [structure: dibenzothiophene with F,F substituents, cyclobutylmethoxy and O—$C_5H_{11}$ groups] | 2 | |

The liquid crystal compound of Example 6 has an appropriate refractive index and clearing point, a high transmittance, and a fast response, and in conjunction with the wide viewing angle advantage of the IPS display modes, it applies to small-sized display applications such as smart phones.

Example 7

| Category | Structural formula of liquid crystal monomer | content (%) | Test parameter |
|---|---|---|---|
| III | [structure: $C_2H_5$—cyclohexyl—cyclohexyl—phenyl(F,F,F)] | 4 | S-N (° C.): ≤ −30<br>Cp (° C.): 75<br>γ1 (mPa·s): 66<br>Δn: 0.1225<br>Δε: 5.5<br>$ε_⊥$: 5.4<br>τ (ms): 21.22<br>T (%): 8.1 |
| III | [structure: $C_3H_7$—cyclohexyl—phenyl—phenyl(F,F,F)] | 5 | |
| II | [structure: $C_3H_7$—cyclohexyl—cyclohexyl—vinyl] | 50 | |
| III | [structure: $C_3H_7$—phenyl—phenyl(F)—phenyl(F,F)—$CF_2O$—phenyl(F,F,F)] | 7 | |
| III | [structure: $C_4H_9$—phenyl—phenyl(F)—phenyl(F,F)—$CF_2O$—phenyl(F,F,F)] | 8 | |

-continued

| Category | Structural formula of liquid crystal monomer | content (%) | Test parameter |
|---|---|---|---|
| III | C₃H₇—⌬—⌬(F)—⌬—F | 6 | |
| III | C₄H₉—⌬—⌬(F)—⌬—F | 5 | |
| I | cyclobutylmethyl-O—[F,O,F dibenzofuran]—O—C₄H₉ | 2 | |
| I | cyclobutylmethyl-O—[F,S,F dibenzothiophene]—O—C₄H₉ | 3 | |
| I | cyclopropylmethyl-O—[F,O,F dibenzofuran]—O—C₃H₇ | 3 | |
| I | cyclopropylmethyl-O—[F,S,F dibenzothiophene]—O—C₄H₉ | 3 | |
| I | cyclopentylmethyl-O—[F,S,F dibenzothiophene]—O—C₄H₉ | 4 | |

The liquid crystal composition of Example 7 has a higher refractive index, which is suitable for low cell thickness displays, as well as a higher clearing point, a wider service temperature, a high transmittance, and a fast response; in conjunction with the wide viewing angle advantage of the IPS display modes, it applies to outdoor display applications.

Although the present invention only lists the specific substances of the above-mentioned eight examples and the proportions thereof in mass percentage, and the performances of the formed liquid crystal compositions are tested, the liquid crystal compositions of the present invention can all achieve the object of the present invention on the basis of the above-mentioned examples by means of the compounds represented by general formulas I, II, III, VI, and VII involved in the present invention and by means of the further expansion and modification of preferred compounds of general formulas I, II, III, VI and VII.

The invention claimed is:

1. A positive dielectric anisotropic liquid crystal composition, comprising all negative compounds represented by formulas I3, I6, I13, I14 and I22, one or more neutral compounds represented by formula II1, and one or more positive compounds represented by formulas III-a, III-b, III-g and III-j:

I3
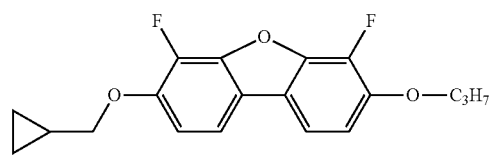

I6
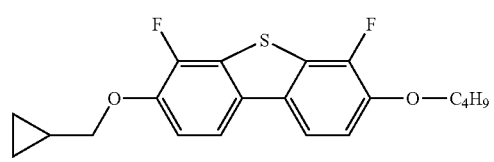

I13
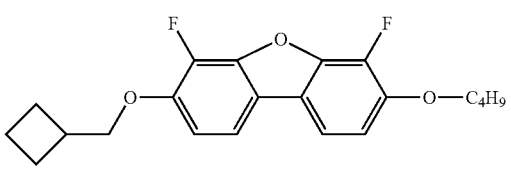

I14
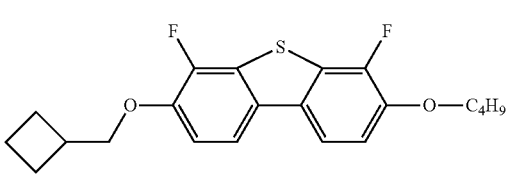

I22
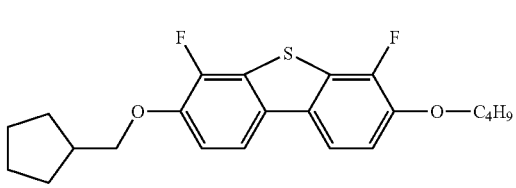

(II1)
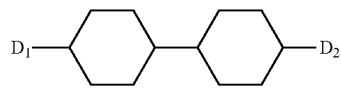

(III-a)
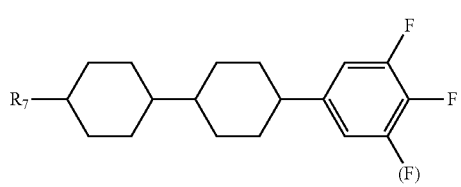

(III-b)
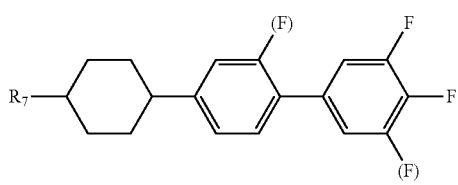

(III-g)
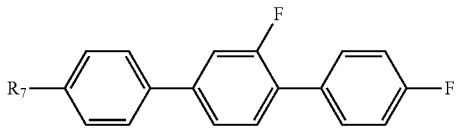

(III-j)
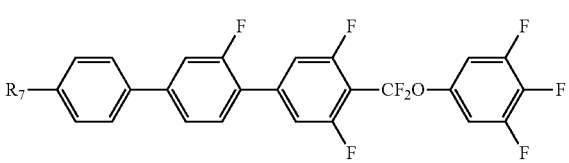

$D_1$ represents an alkyl group having a carbon atom number of 1-10 and $D_2$ represents an alkenyl group having a carbon atom number of 2-10;

wherein $R_7$ represents a linear alkyl group having a carbon atom number of 1-10; and (F) represents hydrogen or fluorine;

in said liquid crystal composition, the total mass content of the negative compounds represented by formula I3 is 3%, the total mass content of the negative compounds represented by formula I6 is 3%, the total mass content of the negative compounds represented by formula I13 is 2%, the total mass content of the negative compounds represented by formula I14 is 3% and the total mass content of the negative compounds represented by formula I22 is 4%.

2. The positive dielectric anisotropic liquid crystal composition according to claim 1, wherein, in said liquid crystal composition, a total mass content of the one or more neutral compounds represented by formulas II1 is 20%80%.

3. The positive dielectric anisotropic liquid crystal composition according to claim 1, further comprising one or more compounds represented by formulas VI-b to VI-e below:

(VI-b)
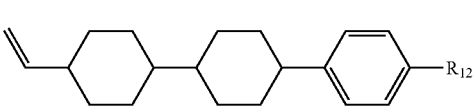

(VI-c)
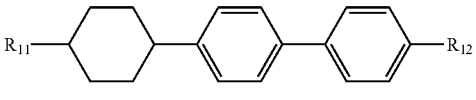

(VI-d)
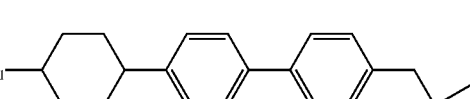

(VI-e)
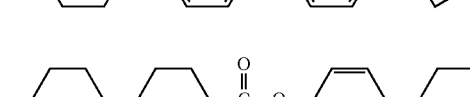

wherein $R_{11}$ and $R_{12}$ each independently represent a linear alkyl group having a carbon atom number of 1-10,

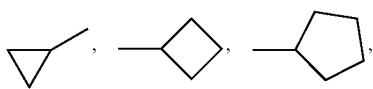

an alkoxy group having a carbon atom number of 1-10 or an alkenyl group having a carbon atom number of 2-10.

4. The positive dielectric anisotropic liquid crystal composition according to claim 1, further comprising one or more compounds represented by formulas VII-c to VII-i below:

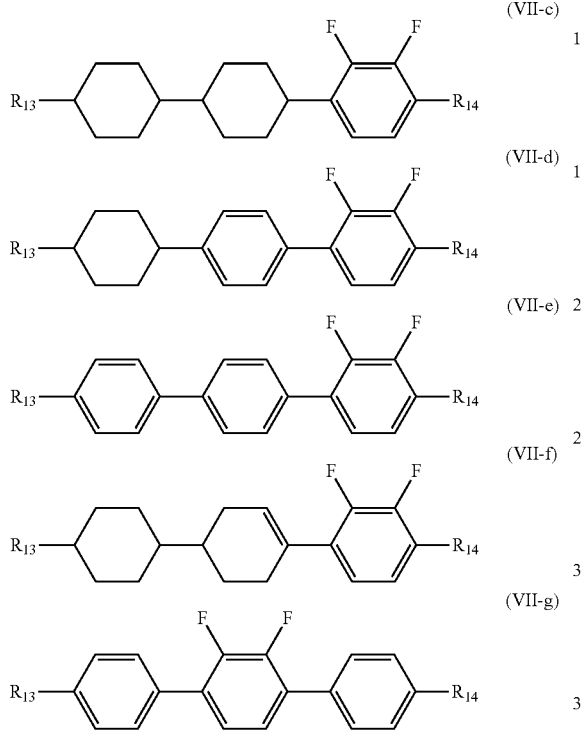

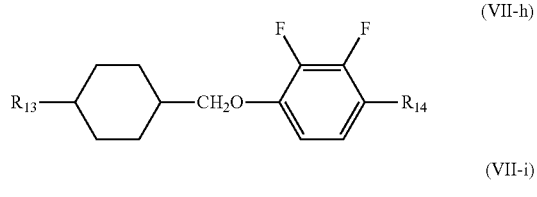

wherein $R_{13}$ each independently represents a linear alkyl group having a carbon atom number of 1-10,

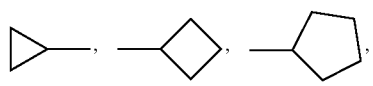

an alkoxy group having a carbon atom number of 1-10 or an alkenyl group having a carbon atom number of 2-10; and $R_{14}$ represents a linear alkyl group having a carbon atom number of 1-5, or an alkyl ether in which an oxygen atom is bonded to a benzene ring.

5. A liquid crystal display device, wherein the liquid crystal display device comprises the positive dielectric anisotropic liquid crystal composition of claim 1, and said liquid crystal display device is an active matrix display device or a passive matrix display device.

* * * * *